United States Patent [19]

Bykhovsky et al.

[11] Patent Number: 5,009,399
[45] Date of Patent: Apr. 23, 1991

[54] DEVICE FOR TRANSFER OF MOLTEN METAL

[76] Inventors: David G. Bykhovsky, ulitsa Esenina, 32, korpus 2, kv. 95; Alexandr N. Panov, naberezhnaya reki Fontanki, 26, kv. 3, both of Leningrad, U.S.S.R.

[21] Appl. No.: 499,331

[22] PCT Filed: Oct. 28, 1988

[86] PCT No.: PCT/SU88/00215
§ 371 Date: Jun. 1, 1990
§ 102(e) Date: Jun. 1, 1990

[87] PCT Pub. No.: WO90/04878
PCT Pub. Date: May 3, 1990

[51] Int. Cl.⁵ ............................................. H02K 44/02
[52] U.S. Cl. .................................... 266/237; 222/591
[58] Field of Search ................ 222/591; 266/236, 237; 75/10.16, 10.67

[56] References Cited

U.S. PATENT DOCUMENTS 4,668,170 5/1987 Barzantny et al. ................. 266/237
4,928,933 5/1990 Motomura ........................... 266/237

FOREIGN PATENT DOCUMENTS 0570173 10/1977 U.S.S.R. .
0649179 2/1979 U.S.S.R. .
0679783 8/1979 U.S.S.R. .
0900781 3/1987 U.S.S.R. .
86/01051 7/1984 World Int. Prop. O. .

Primary Examiner—S. Kastler
Attorney, Agent, or Firm—Burgess, Ryan & Wayne

[57] ABSTRACT

A device for transfer of molten metal comprises a centrifugal conduction MHD pump (1) which is arranged within a molten metal bath (2) and is comprised of a metal housing (3) provided with a cover (4) whose inside surface is connected to one end of a metal rod (6) enclosed by a solenoid (7), while a working chamber (8) is installed between the other end of the metal rod (6) and a bottom (5) of the metal housing in such a way as to be dielectrically insulated from them. The metal housing (3) with its cover (4) and bottom (5), as well as the metal rod (6), the solenoid (7) and the working chamber (8) form a closed magnetic circuit, whereby a magnetic field produced within the working chamber (8) features a maximum magnetic induction obtainable under a preset direct current passing through the solenoid (7). The working chamber (8) communicates with the molten metal bath (2) and is hermetically connected with the pipe for discharge of molten metal.

5 Claims, 2 Drawing Sheets

DEVICE FOR TRANSFER OF MOLTEN METAL

BACKGROUND OF THE INVENTION

1. Technical Field

The present invention relates generally to the metallurgy and the foundry industries and more specifically, to a device for transfer of molten metal.

2. Description of the Prior Art

Known in the present state of the art is a device for transfer of molten metal (No. SU, A, 679,783) having an MHD pump comprised of a ceramic cylindrical housing provided with double walls and having a solenoid installed between the walls. The inner space of the housing is divided by a cross partition into an upper space and a lower space, and the partition has an opening provided therethrough in its central portion. In the upper space of the housing there is provided a graphite electrode installed with a clearance relative to the cross partition so that the space bounded by the cross partition and the graphite electrode forms a working chamber of the MHD pump. A pipe for discharge of molten metal is provided in the housing wall, whereas the working chamber communicates with the molten metal bath through the agency of the lower space and the opening in the cross partition.

A magnetic field in the working chamber of the MHD pump is produced by a solenoid connected to a power supply source. Transfer of molten metal contained in the working chamber is effected due to interaction between the electric current passing through molten metal and the magnetic field produced by the solenoid.

However, due to the fact that the magnitude circuit in such a device is made open and the magnetic induction field lines are closed through an air gap, the amount of magnetic induction within the working chamber will be low. In the above-described device, the working chamber is not hermetically sealed, which restricts the metal pressure developed by the MHD pump.

Known presently is another device for transfer of molten metal wherein metal is heated as it is being transferred by the MHD pump (No. SU, A, 649,179). Such a device comprises a metal housing which incorporates a working chamber hermetically connected with a pipe for the discharge of molten metal. The housing is made from a material having high magnetic permeability and makes part of the magnetic circuit, its outside surface being enclosed by a solenoid.

In the above-mentioned device, transfer of molten metal filling the working chamber occurs due to interaction between the electric current passing through molten metal contained in the working chamber and the magnetic field produced by the solenoid, the magnetic induction vector being directed parallel to the longitudinal axis of the chamber.

However, the above-described components of the magnetic circuit of the MHD pump fail to provide a maximum obtainable amount of magnetic induction in the working chamber, due to the fact that magnetic induction lines of force are completed through air, whereas the housing wall made of steel partly shunts the magnetic field in the working chamber. Besides, part of the current passing through the working chamber flows through the end walls of the chamber rather than through the molten metal, thus also reducing the efficiency of the MHD pump.

SUMMARY OF THE INVENTION

The present invention provides a device for transfer of molten metal wherein the working chamber of the MHD pump and the magnetic circuit are made in such a way as to ensure a maximum pressure of molten metal within the working chamber and in the pipe for discharge of molten metal under minimum magnitudes of the electric current passing through the working chamber and the solenoid of the magnetic system.

The above object is accomplished due to the fact that in a device for transfer of molten metal wherein a centrifugal conduction MHD pump comprises a metal housing provided with a cover and incorporating a working chamber which has a pipe for discharge of molten metal and communicates with a molten metal bath, and a magnetic circuit producing a magnetic field within the molten metal contained in the working chamber, according to the invention, the inside surface of the metal housing cover is connected to one end of a metal rod which is enclosed on its side surface by a solenoid, while a working chamber aligned axially with the metal rod is arranged between the other end of the metal rod and the bottom of the metal housing in such a way as to be dielectrically insulated from them, so that the metal housing with its cover and bottom, the metal rod, the solenoid and the working chamber should form a magnetic circuit, whereas the bottom of the metal housing and the bottom portion of the working chamber are provided with openings forming a duct hermetically connecting the working chamber with the molten metal bath.

It is expedient that the working chamber be formed by a cylindrical metal sleeve aligned axially with respect to the metal rod and restricted on its end by metal disks, so that the wall of the cylindrical metal sleeve be provided with an opening adapted to receive a pipe for discharge of molten metal, while the disk arranged close to the bottom of the metal housing be provided with an opening aligned axially with respect to the opening in the bottom of the metal housing.

Such an embodiment of the centrifugal conduction MHD pump provides a closed magnetic circuit whereby a magnetic field produced within the working chamber features a maximum magnitude of magnetic induction under a preset magnitude of d.c. current passing through the solenoid.

It is reasonable that the cylindrical metal sleeve of the working chamber be made from a material having low magnetic permeability, while the metal disks of the working chamber be made from a material having high magnetic permeability.

Fabrication of the cylindrical sleeve from a material having low magnetic permeability prevents the cylindrical sleeve from shunting the magnetic flux, whereas construction of the metal disks from a material having high magnetic permeability reduces the amount of air gap in the magnetic circuit.

It is also advantageous that the inner surfaces of the metal disks of the working chamber contacting with molten metal be protected by dielectric insulating coating.

This feature enables direct current to flow radially within the working chamber, in strict perpendicular alignment with respect to its longitudinal axis.

To prevent direct current from passing through the metal disk of the working chamber arranged next to the bottom of the metal housing, a joining sleeve should be installed, via an insulating gasket, in a duct formed by openings provided in the metal disk of the working chamber and in the bottom of the metal housing.

SUMMARY OF THE DRAWINGS

In what follows the present invention will now be disclosed in a detailed description of an illustrative embodiment thereof with reference to the accompanying drawings, wherein.

PREFERRED EMBODIMENT OF THE INVENTION

Figure 1:
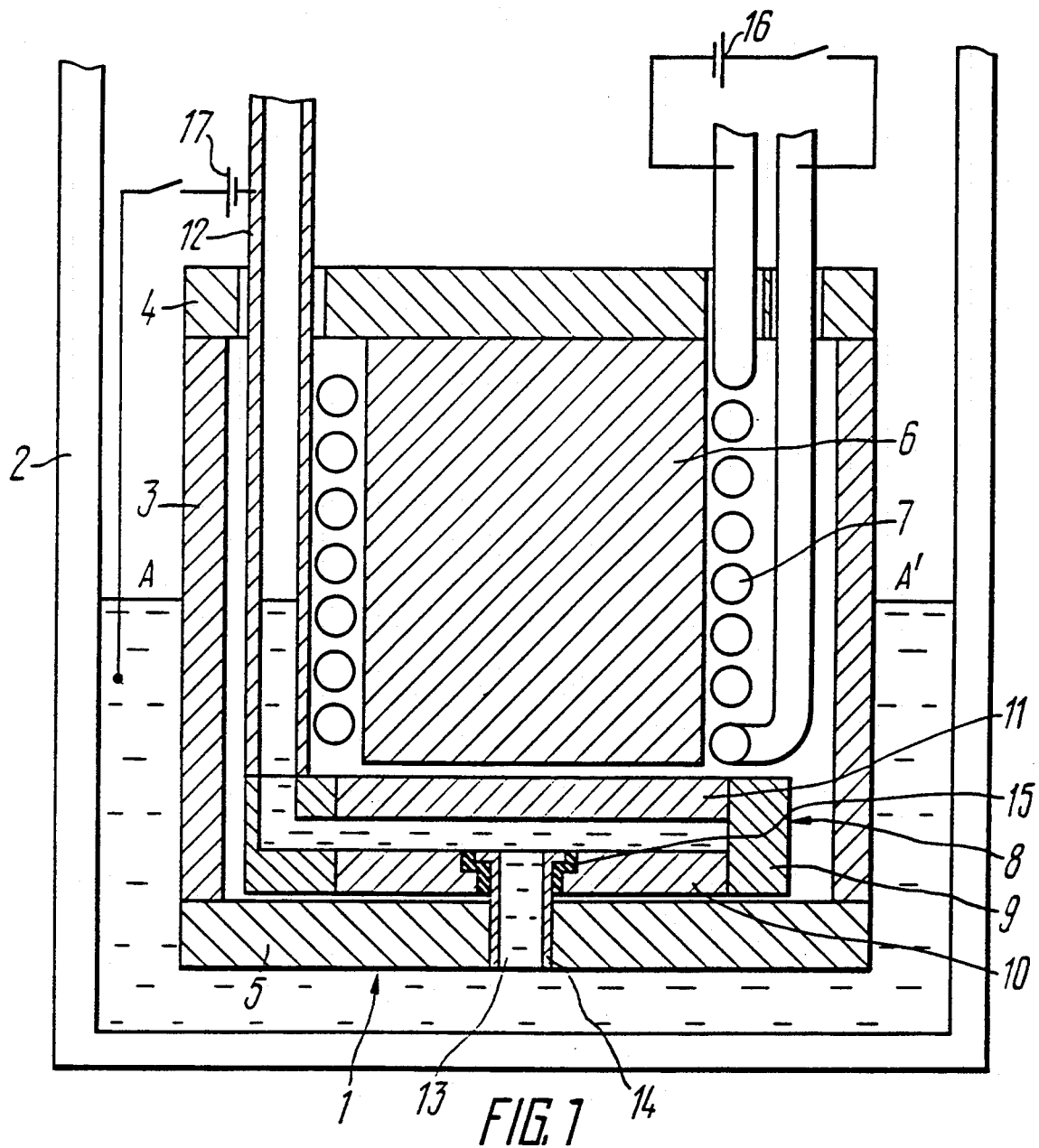
FIG. 1 is a general sectional view of a device for transfer of molten metal, according to the invention.
Figure 2:
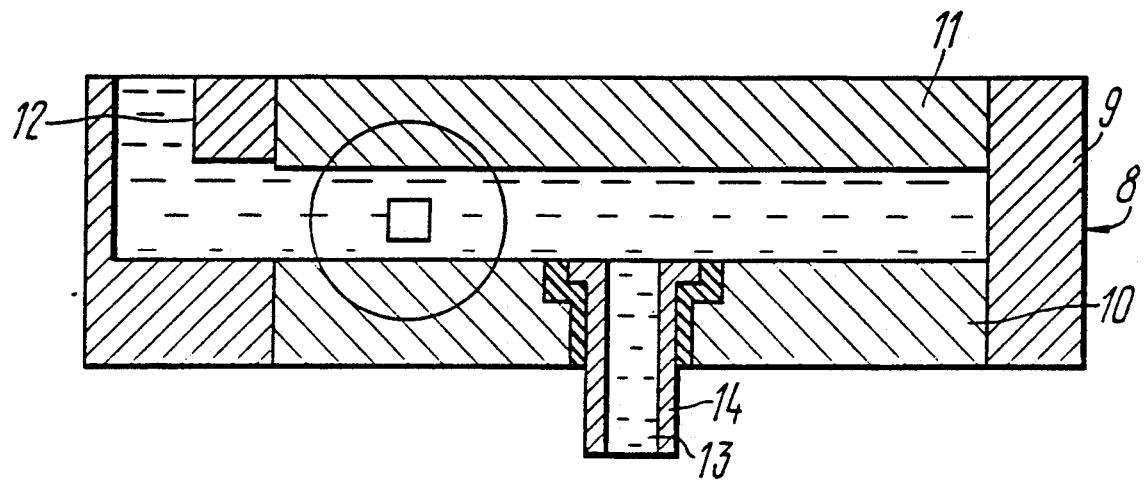
FIG. 2 is a view of a working chamber of the device for transfer of molten metal, according to the invention.

A device for transfer of molten metal, according to the invention, comprises a centrifugal conduction MHD pump 1 (FIG. 1) arranged within a bath 2 containing molten metal. The centrifugal conduction MHD pump 1 comprises a metal housing 3 provided with a cover 4 and a bottom 5. Attached to the inner surface of the cover 4 is one end of a metal rod 6 whose outer side surface is enclosed by a solenoid 7 (the cover 4 can be made integral with the rod 6). A working chamber 8 aligned axially with the metal rod 6 is arranged between the other end of the metal rod 6 and the bottom 5 of the metal housing 3 in such a way as to be dielectrically insulated from them. The working chamber 8 is formed by a cylindrical metal sleeve 9 aligned axially with respect to the metal rod 6 and restricted on its ends by metal disks 10 and 11. The metal housing 3 with the cover 4 and the bottom 5, the solenoid 7 and the working chamber 8 form a closed circuit in which a working gap is afforded by the inner space of the working chamber 8. The wall of the cylindrical metal sleeve 9 of the working chamber 8 is provided with an opening adapted to receive a pipe 12 for discharge of molten metal, while the disk 10 of the working chamber 8 and the bottom 5 of the metal housing 3 are provided with openings forming a duct 13 hermetically connected with the bath 2 containing molten metal. Provision of a hermetically sealed joint between the working chamber 8 and the molten metal bath 2 can be accomplished, for example, through the installation of a joining sleeve 14 (FIGS. 1, 2) which is separated from the disk 10 of the working chamber 8 by a dielectric insulating gasket 15, into the duct 13. The cylindrical metal sleeve 9 of the working chamber 8 is made from a material having low magnetic permeability, while the metal disks 10 and 11 are made from a material having high magnetic permeabiltiy.

Furthermore, the inner surfaces of the metal disks 10, 11 of the working chamber 8 contacting with molten metal are protected by a dielectric insulating coating, and the dielectric insulating coating of the metal disk 10 is hermetically connected with the dielectric insulating gasket 15.

The device for transfer of molten metal operates as follows. The centrifugal conduction MHD pump 1, which is arranged in the bath 2 in such a way that the level of molten metal AA' is above the working chamber 8, is connected to two d.c. power supply sources 16 and 17. The leadout wires of the d.c. power supply source 16 are connected to the leadouts of the solenoid 7, while one of the leadout wires of the d.c. power supply sorce 17 is connected to the pipe 12 for discharge of molten metal and the other leadout wire of the power supply source 17 is connected to molten metal.

As direct current $I_1$ flows from the direct current source 16 through the solenoid 7, a magnetic field is produced between the metal disks 10 and 11 of the working chamber 8, the magnetic induction vector B being directed parallel to the longitudinal axis of the working chamber 8. Since the metal disks 10 and 11 are made from a material having high magnetic permeability, they form a closed magnetic circuit completed also by the metal housing 3, the cover 4, the bottom 5 and the rod 6, so that a maximum magnetic induction value B is obtained under a preset current $I_1$ passing through the solenoid 7.

Figure 3:
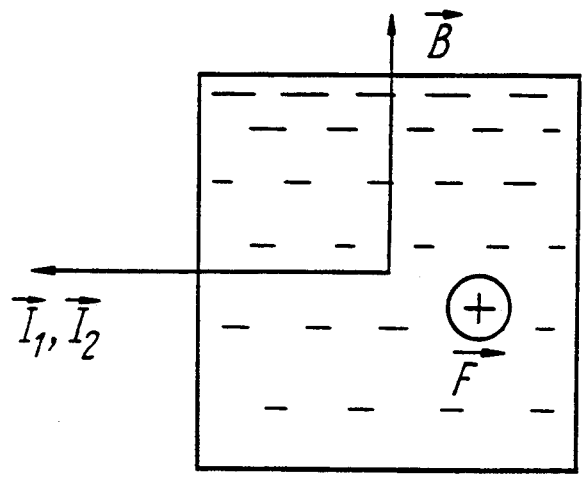
FIG. 3 illustrates main vector quantities affecting the operation of the centrifugal conduction MHD pump.

As power supply from the direct current source 17 is turned on, a current $I_2$ starts to run between the pipe 12 for discharge of molten metal and the molten metal, the current being directed along the following pathway: from molten metal in the bath 2, via molten metal in the duct 13, molten metal in the working chamber 8, to the cylindrical sleeve 9. Because of the dielectric insulating gasket 15 and the dielectric insulating coating provided on the inner surfaces of the metal disks 10 and 11, the current $I_2$ will be directed radially with respect to the working chamber 8, square with its longitudinal axis. The current $I_2$ (FIGS. 2, 3) and the magnetic field vector B acting on the molten metal contained in the working chamber 8 produce a force F directed square with the plane of the drawing. Under the action of the force F, molten metal contained in the working chamber 8 tends to rotate whereby a pressure differential (in common with a conventional centrifugal pump) builds up between the duct 13 and the pipe 12 for discharge of molten metal, with the result that molten metal is transferred from the duct 13 to the pipe 12 for discharge of molten metal.

Thus, the herein proposed device for transfer of molten metal, due to an embodiment of the centrifugal conduction MHD pump, provides a closed magnetic circuit, whereby a magnetic field produced within the working chamber features a maximum magnetic induction value obtainable under a preset value of the direct current passing through the solenoid.

The embodiment of the working chamber prevents the cylindrical sleeve from shunting the magnetic flux, reduces the amount of air gap in the magnetic circuit, thus improving the performance of the magnetic circuit, while the dielectric insulating coating provided on the metal disks of the working chamber ensures a strictly directed flow of the current.

INDUSTRIAL APPLICABILITY

The herein proposed device can be used for transfer of molten metal from furnaces, electrolysis baths or other receptacles, and for filling casting molds.

What is claimed is:

1. A device for transfer of molten metal wherein a centrifugal conduction MHD pump (1) comprises a metal housing (3) provided with a cover (4) and incorporating a working chamber (8) which has a pipe (12) for discharge of molten metal and communicates with a molten metal bath (2), and a magnetic circuit producing a magnetic field within the molten metal contained in the working chamber (8), and wherein the inside surface of the cover (4) of the metal housing (3) is connected to one end of a metal rod (6) which is enclosed on its side surface by a solenoid (7), while the working chamber (8) aligned axially with respect to the metal rod (6) is arranged between the other end of the metal rod (6) and a bottom (5) of the metal housing (3) in such a way as to be dielectrically insulated from them, so that the metal housing (3) with its cover (4) and the bottom (5), the metal rod (6), the solenoid (7) and the working chamber (8) form a magnetic circuit, whereas the bottom (5) of the metal housing (3) and the bottom portion of the working chamber (8) are provided with openings forming a duct (13) hermetically connecting the working chamber (8) with the molten metal bath (2).

2. A device for transfer of molten metal as claimed in claim 1 wherein the working chamber (8) is formed by a cylindrical metal sleeve (9) aligned axially with respect to the metal rod (6) and restricted on its ends by metal disks (10, 11), so that the wall of the cylindrical metal sleeve (9) is provided with an opening adapted to sealingly receive the pipe (12) for discharge of molten metal, while the disk (10) arranged close to the bottom (5) of the metal housing (3) is provided with an opening aligned axially with respect to the opening in the bottom of the metal housing (3).

3. A device for transfer of molten metal as claimed in claim 2 wherein the cylindrical metal sleeve (9) of the working chamber is made from a material having low magnetic permeability while the metal disks (10, 11) of the working chamber (8) are made from a material having high magnetic permeability.

4. A device for transfer of molten metal as claimed in claim 3 wherein the inner surfaces of the metal disks (10, 11) of the working chamber (8) contacting with molten metal are protected by dielectric insulating coating.

5. A device for transfer of molten metal as claimed in claim 2 wherein a joining sleeve (14) is installed, via an insulating gasket (15), in the duct (13) formed by openings provided in the metal disk (10) of the working chamber (8) and in the bottom (5) of the metal housing (3).

* * * * *